Oct. 12, 1954  W. R. CUSTER  2,691,494
AIRPLANE WITH PRESSURE BALANCED WING CHANNELS
Filed June 10, 1952
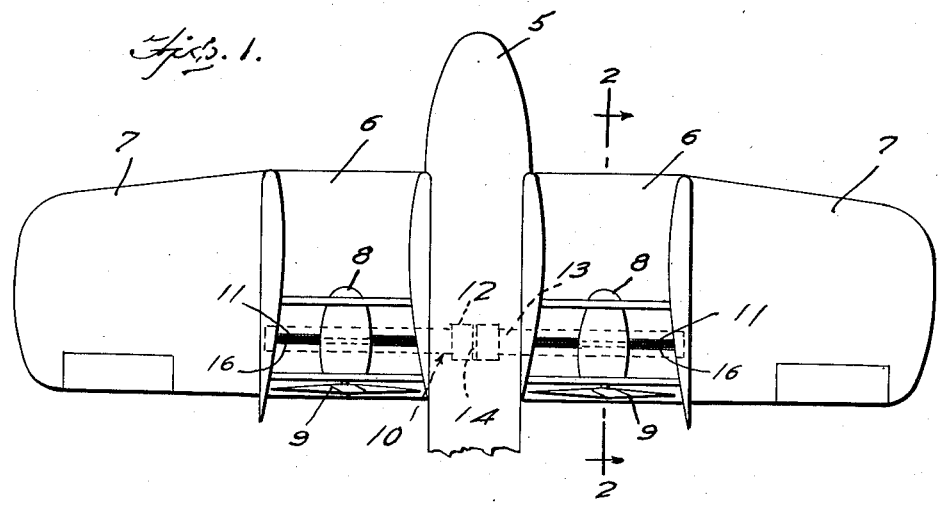
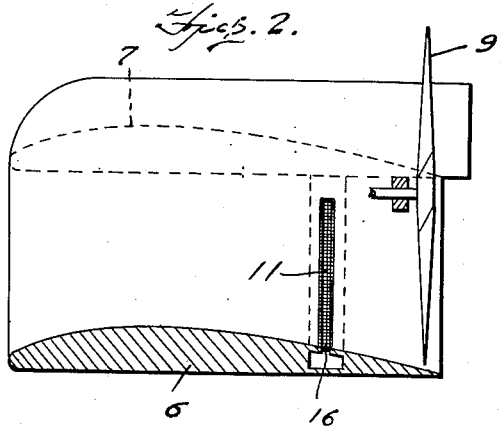
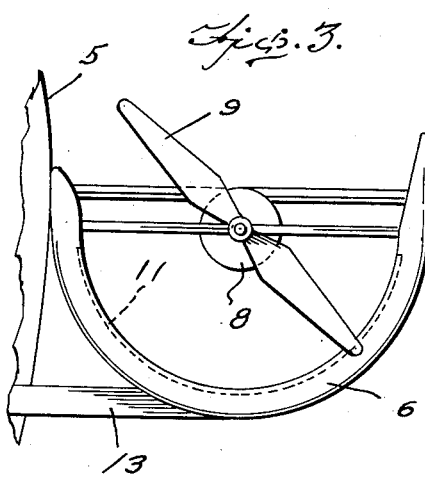
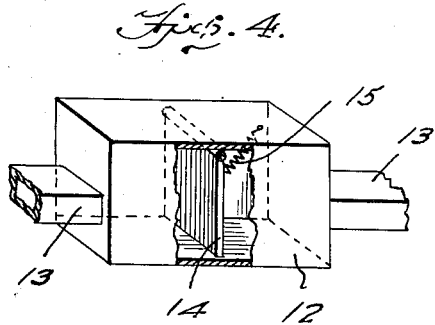
Inventor
Willard R. Custer
By
ATTY Patented Oct. 12, 1954

2,691,494

UNITED STATES PATENT OFFICE 2,691,494

AIRPLANE WITH PRESSURE BALANCED WING CHANNELS

Willard R. Custer, Hagerstown, Md.

Application June 10, 1952, Serial No. 292,659

3 Claims. (Cl. 244—12)

The present invention comprises an aircraft including pressure balanced channel wings, being an improvement over my prior channel wing patents, particularly as exemplified in Patent No. 2,510,959 issued June 13, 1950, and Patent No. 2,532,482 issued December 5, 1950.

Among the objects of this invention is to provide for intercommunication of multiple wing channels whereby mitigation or failure of power in one channel is instantly and automatically corrected so that the power in both or all channels, as the case may be, is equalized, thereby assuring stabilization of the aircraft so long as the power in the remaining channel or channels is effective; to provide power balanced means between the channels which remains closed, during normal operation of the aircraft, to act as a seal between the channels; to provide an intercommunicating unit which is equally effective with plain channels, as embodied in Patent No. 2,510,959, and with boundary layer remover channels as included in Patent No. 2,532,482; and to provide a power equalizing unit capable of use with jet motor or propeller operated airplanes.

Other objects of the invention will be apparent from the following description of the presently preferred form of the invention, wherein:

Fig. 1 is a top plan view of an aircraft constructed in accordance with the present invention, the fuselage being shown fragmentarily;

Fig. 2 is a transverse sectional view through one of the wing channels taken on the line 2—2 of Fig. 1 looking in the direction of the arrows;

Fig. 3 is a rear elevational view of one of the channels constructed in accordance with the present invention, and Fig. 4 is a fragmentary perspective view of the pressure intercommunicating unit showing the manner of engaging the conduit tubes with the confluence box of the unit.

The device of this invention may include a fuselage 5 of any conventional design which has mounted on and secured to each side thereof a channel wing 6 which is substantially semicylindrical, opens upwardly and extends in the direction of flight. If desired the upper outer end of each channel may be extended to provide an outboard wing portion 7. Preferably the channels are of airfoil construction and each is equipped with a suitable power unit generally designated 8. The power unit in the present instance consists of an engine mounted in the channel and in operative connection with a propeller 9 which operates at the aft end of the channel as shown in Fig. 3.

The intercommunicating unit for the channels used for automatically balancing the pressure in said channels is indicated at 10 and includes a conduit which spans the distance between the channels and is engaged to and in communication with slots or recesses 11 formed in the inner walls of the channels preferably adjacent the aft edges of the latter as shown in Fig. 2. The conduit of the unit includes a confluence or junction box 12 from the opposite ends of which conduit tubes 13 extend, these tubes opening into the box 12, as illustrated in Fig. 4. The box 12 houses a pivoted valve member 14 which is normally held in a vertical position by a lightly tensioned spring 15. When the pressure in the channels 6 is constant the valve will remain in a vertical position as shown in Fig. 4. A difference in pressure in the channels will cause a corresponding pressure differential on opposite sides of the valve member, and when such pressure differential exceeds the spring centering force it will cause the valve member to sway laterally so as to open communication between the channels in an apparent manner. If, for instance, there is a failure of the motor in one channel, the pressure in the end of the box 12 with which said channel communicates is increased, thereby permitting the valve to be swung upwardly to a position uncovering the tube openings of the channels. In this manner the powered channel is automatically and instantly placed in communication with the channel in which the power failure has taken place to thereby balance the pressure in the channels and stabilize the aircraft.

Due to the presence of the centrally biased valve member, a limited pressure differential between the channels will be generated whenever the power units are out of balance. This feature is advantageous in that it can be utilized to obtain a greater degree of flexibility in maneuvering and control of the aircraft. For example, by manipulating the engine or propeller controls so as to produce unequal propeller thrusts, thereby generating the above-mentioned pressure differential between the channels, the aircraft could be caused to bank and turn under conditions where the conventional control surfaces would be relatively ineffective.

Of course where more than two channels are employed it is understood that the unit may be engaged to and placed in communication with all of the channels and the operation is just the same as here illustrated for the two channels. It is also within the contemplation of the invention to permit manual operation of the valve 14 through any known and conventional mechanism.

The recesses or slots 11 of the channels are in direct communication with the tubes 13 of the unit, preferably at the bases of the channels. Said slots or recesses may extend completely around the inner wall of the channel or may terminate short of the tops thereof. The recesses or slots 11 have a grid or screen 16 mounted thereover, the upper surface of which is uniplanar with the outer surface of the wing channel at the loci of the recesses or slots. The grid or screen provides an adequate cover for the top of the slot to prevent turbulence when the aircraft is traveling at high velocity. Yet the perforations of the screen will be correspondingly adequate to permit the suction of the atmosphere into the recesses or slots.

Various changes may be made within the scope of the appended claims.

What I claim is:

1. An aircraft comprising a fuselage, high lift wing channels on opposite sides of the fuselage, the channels opening upwardly and extending in the direction of flight, and power equalizing means engaged to and in communication with the channels, said means including an intercommunicating conduit to permit the passage of air from one channel to the other upon pressure variation in one channel.

2. An aircraft comprising a fuselage, high lift wing channels on opposite sides of the fuselage, the channels opening upwardly and extending in the direction of flight, a conduit engaged to and interconnecting the channels, and closure means in the conduit for normally sealing communication between the channels in the absence of substantially unbalanced pressures in the channels.

3. An aircraft comprising a plurality of high lift wing channels opening upwardly and extending in the direction of flight, propulsion means in operative communication with each channel, a conduit engaged to and interconnecting said channels, a valve in said conduit, and means normally holding said valve in a closed position, the valve automatically moving into an open position to place the channels in communication upon failure of power in one of the channels.

References Cited in the file of this patent

UNITED STATES PATENTS

| Number | Name | Date |
|---|---|---|
| 1,868,832 | Henter et al. | July 26, 1932 |
| 2,532,482 | Custer | Dec. 5, 1950 |

FOREIGN PATENTS

| Number | Country | Date |
|---|---|---|
| 593,661 | Germany | Mar. 1, 1934 |